United States Patent [19]
Yeckley et al.

[11] Patent Number: 4,711,644
[45] Date of Patent: Dec. 8, 1987

[54] CERAMIC MATERIAL AND METHOD OF MANUFACTURE

[75] Inventors: Russel L. Yeckley, Oakham, Mass.; Bernard North, Greensburg, Pa.

[73] Assignee: Kennametal Inc., Latrobe, Pa.

[21] Appl. No.: 926,849

[22] Filed: Nov. 3, 1986

Related U.S. Application Data

[60] Continuation of Ser. No. 867,910, May 23, 1986, abandoned, which is a continuation of Ser. No. 800,955, Nov. 22, 1985, abandoned, which is a division of Ser. No. 466,716, Feb. 15, 1983, Pat. No. 4,563,433, which is a continuation-in-part of Ser. No. 351,289, Feb. 22, 1982, abandoned.

[51] Int. Cl.$^4$ ............................................. C04B 35/58
[52] U.S. Cl. ...................................... 51/307; 501/97; 501/98
[58] Field of Search .................... 501/97, 98; 51/307

[56] References Cited

U.S. PATENT DOCUMENTS

| | | | |
|---|---|---|---|
| 4,127,416 | 11/1978 | Lumby et al. | 501/97 |
| 4,310,499 | 1/1982 | Mitomo et al. | 501/98 |
| 4,327,187 | 4/1982 | Komatsu et al. | 501/98 |
| 4,354,990 | 10/1982 | Martinengo et al. | 264/65 |

FOREIGN PATENT DOCUMENTS

| | | |
|---|---|---|
| 15421 | 9/1980 | European Pat. Off. |
| 50-128708 | 10/1975 | Japan |

OTHER PUBLICATIONS

Jack, K. H., "Siglon Tool Materials," *Towards Improved Performance of Tool Materials*, Tiptom '81, The National Physical Laboratory & The Metals Society, pp. 122–125, 1981, Teddington.

Mitomo et al., "Electrical Conductivity of α-Sialon Ceramics", *Journal of Materials Science* 16 (1981)-*Letters*, pp. 552–554, 1981, Chapman & Hall Ltd.

Jack, K. H., "The Significance of Structure & Phase Equilibria in the Development of Silicon Articles and SiAlON Ceramics", *Science of Ceramics*, vol. 11, pp. 125–141, 1981.

Mitamo et al., "The Strength of α-Sialon Ceramics", *Journal of Material Science* 15 (1980)-*Letters*, pp. 2661–2662, 1980, Chapman & Hall Ltd.

Jack, K. H., "Phase Assemblages in Nitrogen Ceramics and Their Relationships with Properties", pp. 295–305; 1979.

Grand et al, "Composition of Stability of Y—Si—Al—O—N Solid Solutions Based on $\alpha Si_3N_4$ Structure", *Journal of Materials Science* 14(1979)-*Letters*, pp. 1749–1751, 1979; Chapman & Hall Ltd.

(List continued on next page.)

*Primary Examiner*—Mark L. Bell
*Attorney, Agent, or Firm*—John J. Prizzi

[57] ABSTRACT

A dual phase silicon aluminum oxynitride material comprising a first phase Si-Al-O-N, commonly referred to as β—Si—Al—O—N, and a second phase Si-Al-O-N referred to as α—Si—Al—O—N. In addition to the double phase Si-Al-O-Ns, there is included a glassy type material which can formulate up to ten percent by weight of the total composition. The material may be manufactured by forming a polytype material made from reacted alumina, aluminum nitride and silicon nitride. The polytype material may be mixed with further powders of silicon nitride and an oxide of yttrium, lithium or calcium and finally reacted to a double phase Si-Al-O-N material where hardness is increased by the additional α-Si-Al-O-N is increased significantly affecting its strength.

The material may be formed in situ by mixing aluminum nitride, alumina, silicon nitride, together with an oxide of yttrium, lithium or calcium. These materials can then be sintered to a final product containing a double phase Si-Al-O-N. Control of the alumina content in the polytype or in situ methods affects the percentage of α-Si-Al-O-N produced in the final product. The hardness of the material increases with the α-Si-Al-O-N content without significantly affecting its transverse rupture strength.

7 Claims, 1 Drawing Figure

OTHER PUBLICATIONS

Jack, K. H., "The Role of Additives in the Densification of Nitrogen Ceramics", Second Annual & Final Technical report, Oct. 1979, European Research Office, London, England.

Jack, K. H., "The Relationship of Phase Diagrams to Research & Development of Sialons", *Phase Diagrams Materials Science & Technology*, vol. V, pp. 241–285, 1978, Academic Press, New York.

Jack, K. H., "The Sialons", *Mat. Res. Bull.*, vol. 13, pp. 1327–1333, 1978, Pergram Press, Inc.

Hampshire et al., "α-Sialon Ceramics", *Nature*, vol. 274, pp. 330–332, Aug. 31, 1978; MacMillan Journals Ltd.

Jack, et al, "Ceramics Based on the Si—Al—O—N and Related Systems", *Nature Physical Science*, vol. 238, pp. 23–24, Jul. 10, 1972.

Jama et al., "The Lithia-Silicon Nitride-Aluminum System", pp. 244–308.

Jack, K. H., "Review Sialons and Related Nitrogen Ceramics", *Journal of Materials Science* 11 (1976), pp. 1135–1158, 1976; Chapman & Hall Ltd.

Rae et al; "The Structure of Yttrium Silicon Oxynitride and Its Role in the H-α-Pressing of Silicon Nitride with Yttria Additions", *Special Ceramics* 6, vol. 6, pp. 347–360, 1975; The British Ceramics Research Association.

CERAMIC MATERIAL AND METHOD OF MANUFACTURE

RELATED APPLICATIONS

This application is a continuation of application Ser. No. 867,910, filed May 23, 1986, now abandoned, which is a continuation of application Ser. No. 800,955, filed Nov. 22, 1985, now abandoned, which was a division of application Ser. No. 466,716, filed Feb. 15, 1983, and now U.S. Pat. No. 4,563,433, which was a continuation-in-part of application Ser. No. 351,289, filed Feb. 22, 1982, now abandoned.

BACKGROUND OF THE INVENTION

This invention concerns Si-Al-O-N type materials and is more particularly concerned with the double phase Si-Al-O-N useful for the manufacture of cutting inserts used in metalworking.

There are numerous papers and patents describing the relatively new Si-Al-O-N material which have been created by the addition of the aluminum and oxygen atoms to silicon nitride materials.

Most recently, these materials have found their way into the metalworking industry and have provided possibilities in the working of cast iron, nickel based super alloys, and other similar substances.

More particularly, cutting inserts of a Si-Al-O-N type material made in accordance with U.S. Pat. No. 4,127,416, which is incorporated herein by reference, have proven to be useful in certain metal-working situations. The type of material made by the above-mentioned United States patent is manufactured as a predominantly single phase $\beta$-Si-Al-O-N material with approximately 10 to 20 percent of a glassy phase present.

The material is made essentially as described in the patent which involves forming a polytype material as an initial step in the process. The polytype material may then be reacted with a controlled amount of silicon nitride and an oxide of yttrium, lithium or calcium to form a ceramic of at least 80, and preferably 95, percent being of a single pase $\beta$-type Si-Al-O-N.

Such a material, when produced, has a transverse rupture strength in the range of 100,000 to 110,000 pounds per square inch using the procedure described in later examples and a knoop hardness in the range of 1450 to 1800 kilograms per square millimeter at 100 grams load.

BRIEF SUMMARY OF THE INVENTION

According to the present invention, a double phase Si-Al-O-N material is produced, especially for use as a cutting insert material. The double phases are comprised of $\alpha$ and $\beta$ phase Si-Al-O-Ns.

It was discovered that control of the amount of alumina in the mixture together with a neutral media for milling allows one to control the composition of the final material such that the $\alpha$ and $\beta$ type Si-Al-O-N phases will appear. Less alumina produces a greater amount of $\alpha$ phase Si-Al-O-N. Control of the other starting components will also produce the same effect, such as less silica, more aluminum nitride, more polytype, increased yttria all produce more $\alpha$ Si-Al-O-N in the finished product. Preferably, the $\alpha$ phase Si-Al-O-N will range from 10 to 70 percent by weight, while the $\beta$ phase Si-Al-O-N in the composition will range from 20 to 90 percent by weight. A glassy phase ranging from zero to 10 percent by weight will also be present.

Increasing the $\alpha$-Si-Al-O-N in the composition causes the hardness to be increased without significantly affecting the transverse rupture strength of the material.

Compounds of yttrium are used as sintering aids in the manufacture of the above-mentioned product, but it is to be recognized that similar results could be obtained with oxides of scandium, cerium, lanthanum and the elements of the lanthanide series.

Use of the yttria as the preferred sintering aid gives rise to an intergranular component predominantly comprising a glass phase but which may also comprise other phases which include YAG (yttriuma luminum garnet) which is a cubic phase having the formula $Y_3Al_5O_{12}$; Y-N-$\alpha$-Wollastonite, which is a monoclinic phase of formula $YSiO_2N$; YAM, which is a monoclinic phase of the formula $Y_4Al_2O_9$; N-YAM, which is a monoclinic phase of formula $Y_4Si_2O_7N_2$ which is isostructural with YAM and forms a complete solid solution with it.

BRIEF DESCRIPTION OF THE DRAWINGS

The exact nature of the invention will become more clearly apparent upon reference to the following detailed specification taken in connection with the accompanying drawings in which.

DETAILED DESCRIPTION OF THE INVENTION

Figure 1:
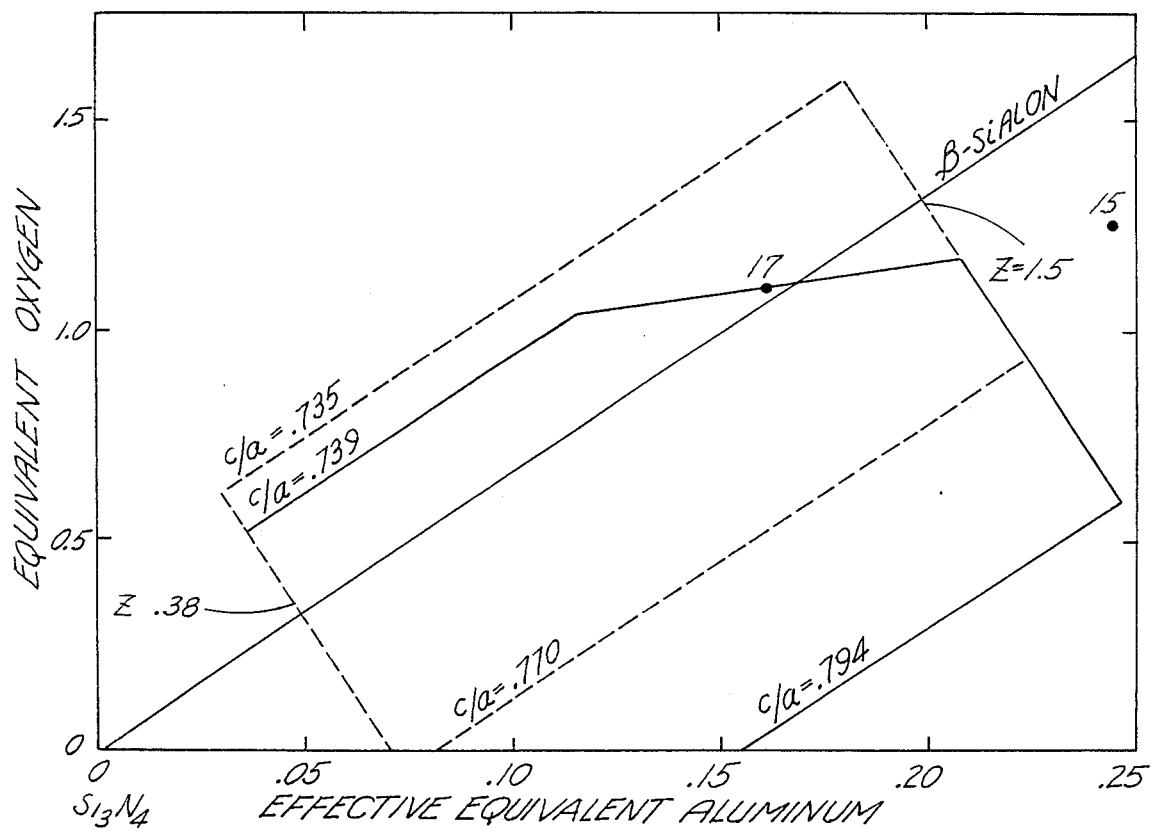
FIG. 1 shows the silicon nitride corner of the base plane of the Si-Al-O-N phase diagram as defined in the present invention.

This invention concerns a dual phase Si-Al-O-N ceramic and glassy phase product and method of making said product which comprises the steps of forming a powder mixture consisting essentially of a first component consisting of compounds containing the elements silicon, aluminum, oxygen and nitrogen in proportions such that the ratio of the total number of silicon and aluminum atoms to the total number of oxygen and nitrogen atoms lies in the range 0.735 to 0.77 and such that said compounds react, together with the second component, during the subsequent sintering process to produce a double phase ceramic material with a first phase obeying the general formula $Si_{6-z}Al_zO_zN_{6-z}$ where z is between 0.38 and 1.5, and a second phase being an hexagonal phase and obeying the general formula $(Si, Al)_{12}M_x(O, N)_{16}$ where M can be calcium, or yttrium, or any of the lanthanides, and x is between 0.1 and 2. The second component comprises between 0.1 and 10 percent based on the total weight of the first and second components, the second component being an oxide of at least one of the further elements yttrium, scandium, cerium, lanthanum, and the metals of the lanthanide series. Said mixture is then sintered in a protective (protective meaning non-reactive) environment with or without the application of pressure at a temperature between 1600 degrees Centigrade and 2000 degrees Centigrade and for a time, decreasing with increasing temperature, of at least ten minutes to at least five hours so as to produce a ceramic material containing at least 90 percent by volume of said double phase ceramic material with said second phase containing part of said second component.

In the method described in the preceding paragraph, the compounds of the first component are arranged so that the sum of all the silicon and aluminum atoms in the compounds divided by the sum of all the oxygen and nitrogen atoms present is between 0.735 and 0.77, or more preferably 0.745 to 0.76. The two component mixture is then sintered in a protective (protecting meaning non-reactive) environment, preferably a non-oxidizing environment, or more preferably, a reducing environment, at 1600 degrees Centigrade to 2000 degrees Centigrade for a time sufficient to produce at least 90 percent by volume of the silicon aluminum oxynitride ceramic material defined by the above formulae. The sintering time required increases with decreasing temperature so that, although the minimum time is only ten minutes in the case of a 2000 degrees Centigrade sintering temperature, with a temperature of 1600 degrees Centigrade, a sintering time of at least five hours is required.

The components forming the first component of the original mixture are conveniently silicon nitride, aluminum nitride, alumina and silica, with at least part of the silica and alumina being present as inherent impurities on the silicon nitride and aluminum nitride, respectively.

Alternatively, the first component may be defined by silicon nitride and a ceramic intermediary containing a silicon aluminum oxynitride which does not obey the general formula $Si_{6-z}Al_zO_zN_{6-z}$. Such materials are referred to as polytypes and are described and defined in U.S. Pat. No. 4,127,416, which has already been incorporated herein by reference. Examples 7 through 17 utilize the 21R type polytype defined in said U.S. patent. Preferably, the silicon aluminum oxynitride of the ceramic intermediary has a rhombohedral structure and obeys the approximate formula $SiAl_6O_2N_6$. Moreover, the ceramic intermediary is preferably formed by heating a powder mixture of alumina, aluminum and silicon to between 1200 degrees Centigrade and 1400 degrees Centigrade in a nitriding atmosphere, the heating rate being controlled to substantially prevent exotherming, and then sintering the nitrided mixture at a temperature between 1500 degrees Centigrade and 1900 degrees Centigrade.

Alternatively, the intermediary may be formed by heating a powder mixture of alumina, aluminum nitride and silicon nitride at a temperature between 1200 degrees Centigrade and 2000 degrees Centigrade in a protective environment, preferably a nonoxidizing environment, or more preferably, a reducing environment.

In the methods described above, the relative proportions of the compounds present in the mixture are arranged so as to produce the dual phase ceramic material with a first phase obeying the formula $Si_{6-z}Al_zO_zN_{6-z}$ and a second phase obeying the formula $(Si, Al)_{12}M_x(O, N)_{16}$ where z is between 0.38 and 1.5 since having the z value within these limits is found to produce a coherent product having a high strength even when the sintering is performed in the absence of pressure. If, on the other hand, the z value is allowed to fall below 0.38, the material becomes difficult to sinter without the application of pressure, while the strength of the product deteriorates if the z value is allowed to increase above 1.5.

Moreover, the relative proportions of the compounds in the first component are arranged so as to provide the above defined atomic ratio of between 0.735 and 0.77 since, if the ratio falls below 0.735, it is found that the mixture becomes too oxygen-rich. This results in the production of an excessive amount of glass during sintering which not only has a deleterious effect on the high temperature strength properties of the product, but is also found to adversely affect the low temperature strength properties. Moreover, it is found that the glass cannot be removed by the subsequent heat treatment process discussed in detail below. By way of contrast, if said atomic ratio exceeds 0.77, it is found that there is insufficient oxygen present to form the glass required to effect consolidation of the product.

The permitted range of 0.1 to 10 percent by weight for the second component of the starting mixture is also chosen on the basis that it provides a satisfactory glass content in the sintered product. The elements selected for the second component are cerium, yttrium, scandium, lanthanum or one of the lanthanide series since these have highly refractory oxides which produce high melting point glasses with the silica and alumina present and hence allow the product to be used at higher temperature than would be possible with low melting point glasses. The second component is also necessary for the formation of the α-Si-Al-O-N phase of the first component since, by definition, the α-Si-Al-O-N contains yttrium or one of the lanthanides. Of the elements selected for the second component, yttrium is preferred, since the presence of yttria in the sintering mixture is found to result in products of high strength even without the application of pressure.

It will be seen that performing the methods described above results in the formation of a sintered ceramic product containing at least 90 percent by volume of a dual phase silicon aluminum oxynitride, together with an intergranular component predominantly comprising a glassy phase but also possibly containing other phases such as YAG, YAM, N-YAM and Y-N-α-Wollastonite. The presence of glass aids consolidation of the product during sintering, but tends to result in a lowering of the high temperature properties of the final component. It has, however, been found that the amount of the glass phase in the sintered product can be reduced by subjecting the product to a final heat treatment process which involves raising the temperature of the product to within 200 degrees Centigrade of the melting point of the glass (i.e., to about 1400 degrees Centigrade in the case of an yttrium glass), and then cooling the product to crystallize at least part of the glass into an intergranular component containing other phases such as YAG, YAM, N-YAM and Y-N-α-Wollastonite.

EXAMPLES

Starting materials used in this application are as listed below, but can be the same starting materials listed in the aforementioned Lucas U.S. Pat. No. 4,127,416, or any of the other known starting materials meeting the known conditions of the manufacture of Si-Al-O-N materials.

Silicon (Elkem Metals)
  Fe<1.0%
  C 0.1–0.4% typical
  Ca<0.07% typical
  Al<0.53%
  −200 mesh particle size
Yttrium (Molycorp, a division of Union 76)
  99.99% pure
  −325 mesh particle size
Aluminum (Alcan Aluminum Corporation)
  99.3% pure
  16 micron average particle size
Alumina (Reynolds)
  RC-172DBM
  99.7% $Al_2O_3$ 0.04% Na$_2$O
0.07% SiO$_2$
0.03% Fe$_2$O$_3$
particle size < 1 micron
Alumina (Alcoa)
A-16SG
99.5% Al$_2$O$_3$
0.05–0.09% Na$_2$O
0.02–0.04% SiO$_2$
0.01–0.02% Fe$_2$O$_3$
particle size < 1 micron In Table 2, the percent α-Si-Al-O-N and β-Si-Al-O-N was originally based on 100 percent, since no other crystalline phases were present and ignored the 10 percent glass which cannot be quantified by x-ray diffraction. The percentages were revised to include the 10 percent glass and, therefore, the percentages α-Si-Al-O-N and β-Si-Al-O-N will total 90 percent, making the percentages consistent with Table 2 (continued). Depending upon the convention one chooses, the percentages will be correct.

EXAMPLE 1

A composition consisting of 92 parts by weight silicon nitride powder (containing about 4 weight percent surface silica), 5 parts by weight of aluminum nitride (containing about 6 weight percent surface alumina), 5 parts by weight of alumina and 7 parts by weight of yttrium oxide was milled in isopropanol for 96 hours using Si-Al-O-N media to a mean particle size of 0.96 microns. Following drying, the powder was screened through a 50 mesh sieve and isostatically pressed at 30,000 psi. Pieces of green material were cut from the isostatically pressed slug and buried in a 50/50 by weight boron nitride and silicon nitride powder mixture inside a graphite pot. The pot was placed in a graphite element resistance-heated furnace and raised to 500 degrees Centigrade in vacuum and then to 1830 degrees Centigrade in one atmosphere pressure of nitrogen at which temperature it was held for 40 minutes. After cooling bars of the sintered material 0.2×0.2×0.8 inches were ground using a 600 grit abrasive wheel and, following die checking, they were broken in 3 point bend with an outer span of 0.56 inches. Broken pieces were used for density and hardness measurements and phase determination by x-ray diffraction. Properties of the material are given in Table 1.

EXAMPLE 2

As Example 1, but sintered at 1830 degrees Centigrade for 60 minutes.

EXAMPLE 3

A composition consisting of 92 parts by weight silicon nitride powder (containing about 4 weight percent surface silica) 5 parts by weight of aluminum nitride (containing about 6 weight percent surface alumina) 3 parts by weight of alumina and 7 parts by weight of yttrium oxide was milled in isopropanol using alumina grinding media for 48 hours. Attrition from such media amounted to 1.9 parts by weight, which incorporated into the overall composition. The mean particle size of the milled powder was 1.49 microns. The powder was processed as in Example 1, except that sintering was carried out at 1780 degrees Centigrade for 40 minutes and 1830 degrees Centigrade for 15 minutes. Properties are given in Table 1.

EXAMPLE 4

A composition consisting of 92 parts by weight silicon nitride powder (containing about 4 weight percent surface silica), 8 parts by weight of aluminum nitride (containing about 6 weight percent surface alumina), and 7 parts by weight of yttrium oxide was milled in isopropanol for 168 hours using dense Si-Al-O-N media to a mean particle size of 0.63 microns. Then as in Example 1.

EXAMPLE 5

Material, as in Example 4, was given a heat-treatment of 1400 degrees Centigrade for five hours in a static nitrogen atmosphere. Results in Table 1.

EXAMPLE 6

A composition consisting of 92 parts by weight of silicon nitride powder (containing about 4 weight percent surface silica), 8 parts by weight of aluminum nitride (containing about 6 weight percent surface alumina), and 5 parts by weight of yttrium oxide was milled in isopropanol using alumina grinding media for 48 hours. Attrition from such media amounted to 2.0 parts by weight which was incorporated into the overall composition. The mean particle size of the milled powder was 1.47 microns. Then as in Example 1, but sintered at 1850 degrees Centigrade for 60 minutes. Results in Table 1.

POLYTYPE EXAMPLES

EXAMPLE 7

A powder mixture was made up comprising 86.9 w/o (weight percent) silicon nitride, 6.59 w/o 21R polytype and 6.54 w/o yttria. The powder mixture was then milled for two days utilizing Si-Al-O-N cycloids as the media until the resulting average particle diameter was 1.07 microns and 90 percent finer than 2.21 microns. The powder was then cold isostatically pressed at 30,000 psi, and the green slug was then sintered under the same conditions as the previous examples at 1830 degrees Centigrade for 50 minutes.

The sintered material was then analyzed and properties are given in Table 2.

EXAMPLE 8

The powder was processed as described in Example 7 except that the starting powder mixture consisted of 81.3 w/o silicon nitride, 12.1 w/o 21R polytype, 6.54 w/o yttria. Sintered material was analyzed and properties are given in Table 2.

EXAMPLE 9

The processing of this powder was the same as in Examples 7 and 8, except that the ball milling media was alumina cycloids. The original powder mixture was 86.9 w/o silicon nitride, 6.54 w/o 21R polytype, and 6.54 w/o yttria. The powder was milled at an average particle diameter of 0.91 microns and 90 percent finer than 1.72 microns. It was found that the powder mixture had an additional 3.55 w/o milled pick-up from the alumina cycloids.

The mix was then sintered at 1780 degrees Centigrade for forty minutes and 1830 degrees Centigrade for 25 minutes. The sintered material was analyzed and properties are given in Table 2.

EXAMPLE 10

The powder mixture was processed with 82.2 w/o silicon nitride, 11.2 w/o 21R poltype, 6.54 w/o yttria and an additional 3.57 w/o from wear of alumina cycloids during ball milling. The average particle diameter was 0.93 microns with 90 percent finer than 1.77 microns after milling. This composition was sintered on the same schedule as Example 9. The sintered material was then analyzed and properties are given in Table 2.

EXAMPLE 11

The powder mixture was processed with 85 w/o silicon nitride, 8.4 w/o 21R polytype, 6.54 w/o yttria, and a direct addition of 2.51 w/o alumina and 0.1 w/o of silica. The mix was milled with Si-Al-O-N media to an average diameter of 1.0 microns. The sintered material was then analyzed and properties are given in Table 2.

EXAMPLE 12

A composition consisting of 83 parts by weight $Si_3N_4$ (with 1.0 w/o O as a surface layer), 17 parts by weight 21R polytype, 7 parts by weight yttria and 3 parts by weight alumina was milled in isopropanol for 72 hours using Si-Al-O-N media to a mean particle size of 0.71 microns. Following drying, the powder was screened through a 50 mesh sieve and isostatically pressed at 30,000 psi. Pieces of green material were cut from the isostatically pressed slug and buried in a 75/25 by weight silicon nitride and boron nitride powder mixture inside a graphite pot. The pot was placed in a graphite element resistance heated furnace and raised to 900 degrees Centigrade under vacuum and then to 1780 degrees Centigrade for 40 minutes in one atmosphere nitrogen followed by 25 minutes at 1830 degrees Centigrade and cooled in approximately 30 minutes to 1000 degrees Centigrade. Properties are given in Table 2.

EXAMPLE 13

A composition consisting of 77 parts by weight silicon nitride (with 1.09 w/o O as a surface layer) 23 parts by weight 21R polytype, 7 parts by weight yttria and 3 parts by weight alumina. Processing was identical to Example 12. The mean particle size of the milled powder was 0.84 microns. Properties are given in Table 2.

EXAMPLE 14

A composition consisting of 75 parts by weight silicon nitride (with 1.09 w/o O as a surface layer), 25 parts by weight 21R polytype, 7 parts by weight yttria and 3 parts by weight alumina. Processing was identical to Example 12. The mean particle size of the milled powder was 0.92 microns. Properties are given in Table 2.

EXAMPLE 15

A composition consisting of 75 parts by weight silicon nitride (with 0.77 w/o O as a surface layer), 25 parts by weight 21R polytype, 7 parts by weight yttria and 9 parts by weight aluminum oxide. Processing was identical to Example 12. The mean particle size of the milled power was 0.82 microns. Properties are given in Table 2.

EXAMPLE 16

A composition consisting of 85 parts by weight silicon nitride, 15 parts by weight 21R polytype, 7 parts by weight yttria and 1.0 parts by weight alumina. Processing was identical to Example 12. The mean particle size of the milled powder was 0.95 microns. Properties are given in Table 2.

EXAMPLE 17

A composition consisting of 85 parts by weight silicon nitride, 15 parts by weight polytype, 7 parts by weight yttria and 8 parts by weight alumina. Processing was identical to Example 12. The mean particle size of the milled powder was 1.09 microns. Properties are given in Table 2.

The composite material produced in the above examples showed superior metalcutting results when used as a cutting insert. Superior results were obtained when machining cast iron and nickel base alloys. Test results reported in the tables for the first eleven examples reported the transverse rupture strength of the material as determined by the method described in the Lucas Industries U.S. Pat. No. 4,127,416 and the dimensions specified in Example 1 of the specification.

Subsequently, it was decided that fracture toughness of the material was a much better indication of metalcutting ability for the material than the transverse rupture values. For new Examples 12 through 17, these values are now reported instead of the transverse rupture values.

The fracture toughness tests used a Vickers diamond indentation with an 18 kilogram load. Fracture toughness was calculated from the dimensions of the indentation and associated cracks together with the load and a Youngs modulus value of 305 G Pa using the method described in A. G. Evans and E. A. Charles *Journal of the American Ceramic Society,* Volume 59 (1976), Page 371.

Examples 10, 12, 13 and 14 demonstrate the increase in percent $\alpha$-Si-Al-O-N with increasing polytype. Examples 16 and 17, 14 and 15 demonstrate the decrease in $\alpha$-Si-Al-O-N content and hardness with alumina content.

The present invention is further defined with reference to FIG. 1. Reference is had to Lucas Industries U.S. Pat. Nos. 4,127,416 and 4,113,503, in which the Si-Al-O-N phase diagram is shown.

The rectangular composition area claimed by Lucas is outlined in the attached drawing. The boundaries are set at z values of 0.38 and 1.5, where "z" is found in the formula for $\beta$-Si-Al-O-N of $Si_{6-z}Al_zO_zN_{8-z}$. The upper and lower boundaries are cation to anion ratios (c/a) of 0.735 and 0.770. Lucas defined the c/a ratio as moles silicon plus moles aluminum divided by the quantity moles oxygen plus moles nitrogen. The contribution of yttria was not included. Exceeding the upper c/a ratio, results in too much glass, which is deleterious to properties of the single phase $\beta$-Si-Al-O-N. Sintering the single phase $\beta$-Si-Al-O-N is difficult with ratios higher than 0.770.

The compositional area, which overlaps the Lucas area, was defined with distinct differences. The boundaries set at z=0.38 and z=1.5 are common with Lucas, but the upper and lower boundaries are based on the presence of a two-phase ceramic, $\alpha$-Si-Al-O-N plus $\beta$-Si-Al-O-N. The c/a ratio is defined as moles silicon plus moles aluminum plus moles yttrium divided by the quantity moles oxygen plus moles nitrogen. Yttria is included in the c/a ratio, which is appropriate since yttrium is an integral part of $\alpha$-Si-Al-O-N.

Second, the equivalents calculated by Lucas considers only Si, Al, O, N, excluding $Y_2O_3$. The present compositions have equivalent calculated with yttria, which result in a compositional point slightly above the base plane on the phase diagram. The compositional point is then projected onto the base plane resulting in an effective equivalent for silicon and aluminum. Oxygen and nitrogen will not be affected. The effective equivalents are plotted in FIG. 1. The table below shows the differences between lucas and the present method for Example 9.

TABLE I

|  | Si | Al | O | N | Y | c/a |
|---|---|---|---|---|---|---|
| Lucas Equivalent | .9299 | .0701 | .0553 | .9447 | — | .747 |
| Equivalent (including $Y_2O_3$) | .9102 | .0687 | .0753 | .9247 | .0211 | .744 |
| Effective Equivalent | .9208 | .0793 | .0753 | .9247 | — | — |

In this manner, the compositional region is defined on the base plane, but is indirectly accounting for the influence of yttria, which is important since yttria enters the $\alpha$-Si-Al-O-N structure.

The upper boundary segment with a constant c/a ratio of 0.739 represents the effective equivalent compositions of a final composition between 0–10% $\alpha$-Si-Al-O-N. Examples 17 and 15 define a line $O_{eff\,eq}=0.164-4(Al_{eff\,eq})+0.0865$, which intersects the line of constant c/a of 0.739 at (0.1143, 0.1053) and the line of z=1.5 at (0.2084, 0.1208). The combination of the c/a ratio 0.739 line segment with the segment between the points of intersection described above represents the compositions with an effective equivalent percent that result in a final $\alpha$-Si-Al-O-N content of 0–10%. The lower boundary represents a constant c/a ratio of 0.794. The ratio corresponds to the compositional range for $\alpha$-Si-Al-O-N with the maximum practical yttrium substitution in the $\alpha$-Si-Al-O-N structure. The general $\alpha$-Si-Al-O-N formula, proposed by K. H. Jack, in "The Role of Additives in the Densification of Nitrogen Ceramics," (October 1979), for European Research Office, United States Army Grant No. DAERO-78-G-012, is $Y_xSi_{12-(m+n)}Al_{m+n}O_nN_{16-n}$ where $x=0-2$, $m=1-4$ and $n=0-2.5$.

DEFINITION OF PHASES

1. $\beta'$ is an hexagonal phase having the general formula $Si_{6-z}Al_zO_zN_{8-z}$ where $0<z<4.2$. Detected by X-ray diffraction-characteristic patterns for $z=0$ and $z=4\beta'$.

2. $\alpha'$ is an hexagonal phase having the general formula $(Si, Al)_{12}M_x(O, N)_{16}$ where M=Li, Ca, Y or other lanthanides. Theoretical maximum is x=2; this is approached in the case of Ca but, for Y, practical maximum is about 0.7. Detected by X-ray diffraction.

3. $\alpha$-$Si_3N_4$ is an unsubstituted allotrope of $Si_3N_4$.

4. N-YAM is an monoclinic phase of formula $Y_4Si_2O_7N_2$. Isostructural with YAM-$Y_4Al_2O_9$ and forms a complete solid solution with it.

5. Y-N-$\alpha$-Wollastonite is a monoclinic phase of formula $YSiO_2N$.

6. YAG is a cubic phase of formula $Y_3Al_5O_{12}$. Some substitution of Al by Si and simultaneous replacement of O by N may occur.

TABLE 1

| Example | Transverse Rupture Strength (psi) | Rockwell "A" Hardness (at 60 kg load) | Knoop Hardness (100 g load) (kg mm$^{-2}$) | Density (g cm$^{-3}$) | % $\beta'$ | % $\alpha$-$Si_3N_4$/$\alpha'$ | Other |
|---|---|---|---|---|---|---|---|
| 1 | 106,000 | 93.2 | 1940 | 3.266 | 81 | 9 | Y-containing glassy phase, trace N—YAM ($Y_4Si_2O_7N_2$) |
| 2 | 115,000 | 93.4 | 1890 | 3.271 | 84 | 6 | Y-containing glassy phase, trace N—YAM ($Y_4Si_2O_7N_2$) |
| 3 | 87,000 | 92.5 | 1730 | 3.203 | 80 | 10 | Y-containing glassy phase, N—YAM ($Y_4Si_2O_7N_2$) and Y—N—$\alpha$-Wollastonite ($YSiO_2N$) |
| 4 | 100,000 | 94.6 | 2150 | 3.275 | 47 | 43 | Y-containing glassy phase, N—YAM ($Y_4Si_2O_7N_2$) and Y—N—$\alpha$-Wollastonite ($YSiO_2N$) |
| 5 | 96,000 | 94.8 | 2310 | 3.280 | 49 | 41 | N—YAM, Y—N—$\alpha$-Wollastonite, trace YAG ($Y_3Al_5O_{12}$) |
| 6 | — | 93.0 | 1980 | 3.175 | 58 | 32 | Y-containing glassy phase, N—YAM |

TABLE 2

| Example | Transverse Rupture Strength (psi) | Rockwell "A" Hardness (at 60 kg load) | Knoop Hardness (100 g load) (kg mm$^{-2}$) | Density (g cm$^{-3}$) | % $\beta'$ | % $\alpha$-$Si_3N_4$/$\alpha'$ | Other |
|---|---|---|---|---|---|---|---|
| 7 | 83,485 | 92.9 | — | 3.25 | 74.7 | 15.3 | Y-containing glassy phase with no intergranular crystalline phases |
| 8 | 106,785 | 94.7 | 1761 | 3.276 | 34.2 | 55.7 | Y-containing glassy phase with no intergranular crystalline phases |
| 9 | 111,990 | 92.9 | 1718 | 3.27 | 76.0 | 14.0 | Y-containing glassy phase with no intergranular crystalline phases |
| 10 | 94,856 | 94.0 | — | 3.26 | 54.0 | 36.0 | Y-containing glassy phase with no intergranular crystalline phases |

TABLE 2-continued

| Example | Rockwell "A" Hardness (at 60 kg load) | Knoop Hardness (100 g load) (kg mm$^{-2}$) | Density (g cm$^{-3}$) | % $\beta'$ | % $\alpha$-Si$_3$N$_4$/$\alpha'$ | Other |
|---|---|---|---|---|---|---|
| 11 | 111,596 | 93.3 | 1765 | 3.25 | 63.9 | 26.1 | Y-containing glassy phase with no intergranular crystalline phases |
| | Fracture Toughness | | | | | |
| 12 | 7.59 | 94.0 | 1632 | 3.28 | 51.3 | 38.7 | No other phases present |
| 13 | 7.23 | 93.9 | 1611 | 3.30 | 44.3 | 45.7 | No other phases present |
| 14 | 7.32 | 94.2 | 1598 | 3.30 | 44.5 | 45.5 | No other phases present |
| 15 | 7.44 | 93.0 | 1546 | 3.30 | 80.4 | 9.6 | No other phases present |
| 16 | 6.90 | 94.5 | 1680 | 3.27 | 31.5 | 58.5 | No other phases present |
| 17 | 5.72 | 92.9 | 1503 | 3.26 | 90 | — | No other phases present |

Modifications may be made within the scope of the appended claims.

What is claimed is:

1. A metalcutting insert made by the method of producing a ceramic product, comprising the steps of forming a powder mixture consisting essentially of a first component consisting of compounds containing the elements of silicon, aluminum, oxygen and nitrogen in proportions such that the ratio of the total number of silicon and aluminum atoms to the total number of oxygen and nitrogen atoms lies in the range 0.735 to 0.77 and such that said compounds react together with the second component during the subsequent sintering process to produce a double phase ceramic material wherein a first phase obeys the general formula: Si$_{6-z}$Al$_z$O$_z$N$_{8-z}$ where z is between 0.38 and 1.5; wherein a second phase obeys the general formula (Si, Al)$_{12}$M$_x$(O, N)$_{16}$; and wherein up to 10 percent by weight of a second component is in the form of an oxide of at least one of the further elements, yttrium, scandium, cerium, lanthanum and the metals of the lanthanide series; and wherein sintering said mixture in a non-reactive environment comprises placing said mixture in a graphite pot and covering with a mixture of boron nitride and silicon nitride powders while surrounding said graphite pot and said silicon nitride and boron nitride powders with a nitrogen gas, with or without the application of pressure, at a temperature between 1600 degrees Centigrade and 2000 degrees Centigrade and for a time, decreasing with increasing temperature, of at least ten minutes to at least five hours so as to produce a ceramic material containing said double phase ceramic material together with a second phase containing said at least one further element, which is a glassy phase.

2. A metalcutting insert which is comprised of an $\alpha$ and $\beta$ phase composite of the Si-Al-O-N material and a glassy phase wherein said $\alpha$ phase Si-Al-O-N ranges from 10 to 70 weight percent of said ceramic material, said $\beta$ phase Si-Al-O-N ranges from 20 to 90 weight percent of said ceramic material and said glassy phase ranges from 0.1 to 10 weight percent of said ceramic material.

3. A metalcutting insert of claim 2 which further consists of said ceramic material having a minimum hardness of 92.5 Rockwell "A" as measured with a 60 kilogram load.

4. A metalcutting insert according to claims 2 or 3 wherein said glassy phase may also contain a crystalline phase from the group consisting of YAG, YAM, N-YAM and Y-N-$\alpha$-Wollastonite.

5. A metalcutting insert which consists essentially of an $\alpha$ and $\beta$ phase composite of the Si-Al-O-N material and a glassy phase wherein said $\alpha$ phase Si-Al-O-N ranges from 10 to 70 weight percent of said ceramic material, said $\beta$ phase Si-Al-O-N ranges from 20 to 90 weight percent of said ceramic material and said glassy phase ranges from 0.1 to 10 weight percent of said ceramic material.

6. A metalcutting insert of claim 5 which further consists of said ceramic material having a minimum hardness of 92.5 Rockwell "A" as measured with a 60 kilogram load.

7. A metalcutting insert according to claims 5 or 6 wherein said glassy phase may also contain a crystalline phase from the group consisting of YAG, YAM, N-YAM and Y-N-$\alpha$-Wollastonite.

* * * * *